(12) United States Patent
Hashimoto

(10) Patent No.: US 8,179,574 B2
(45) Date of Patent: May 15, 2012

(54) IMAGE READING DEVICE, IMAGE READING METHOD, AND IMAGE READING PROGRAM

(75) Inventor: Kiyoshi Hashimoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 564 days.

(21) Appl. No.: 12/370,470

(22) Filed: Feb. 12, 2009

(65) Prior Publication Data

US 2009/0201560 A1 Aug. 13, 2009

(30) Foreign Application Priority Data

Feb. 12, 2008 (JP) ................................. 2008-030438
Dec. 4, 2008 (JP) ................................. 2008-309542

(51) Int. Cl.
*H04N 1/04* (2006.01)

(52) U.S. Cl. ....... 358/474; 358/1.15; 358/449; 382/173; 382/232; 382/291

(58) Field of Classification Search .................. 358/474, 358/232, 1.5, 3.11, 3.12, 3.28, 1.12, 1.15, 358/1.18, 1.16, 1.17, 505, 523, 538, 426.02, 358/426.05, 426.14, 449, 450, 453, 462, 358/488; 382/173, 291

See application file for complete search history.

(56) References Cited

U.S. PATENT DOCUMENTS

| 2003/0107781 | A1* | 6/2003 | Ozawa | 358/506 |
| 2005/0029353 | A1* | 2/2005 | Isemura et al. | 235/454 |
| 2007/0058189 | A1* | 3/2007 | Yaguchi | 358/1.13 |

FOREIGN PATENT DOCUMENTS

| JP | 2005-244802 | * | 9/2005 |
| JP | 2005-244802 A | | 9/2005 |

* cited by examiner

*Primary Examiner* — Charlotte M Baker
*Assistant Examiner* — Aaron R Gerger
(74) *Attorney, Agent, or Firm* — Kilpatrick Townsend & Stockton LLP

(57) ABSTRACT

There is provided an image reading device including a tag information reading unit for reading information recorded in an IC tag by performing radio communication with the IC tag attached or embedded at a predetermined position of a medium that becomes a target of image reading and an image reading unit for creating image data of an image recorded on the medium by scanning the medium. The image reading unit determines an area for the scanning based on area information related to the medium among information read by the tag information reading unit and, and scans the determined area.

6 Claims, 5 Drawing Sheets

FIG. 4

```
<?xml version="1.0" encoding="UTF-8"?>
<!DOCTYPE html PUBLIC "-//W3C//DTD XHTML-Print 1.0//EN"
        "http://www.w3.org/MarkUp/DTD/xhtml-print10.dtd">
<html xmlns="http://www.w3.org/1999/xhtml">
<head>
        <title>Patent sample</title>
        <style type="text/css">

@page    {
                   size: 210mm 297mm;                          D1
                   margin: 0mm;
                   } body {
                   line-height: 1.0;
                   padding: 0px;
                   font-size: 10pt;
                   }
    D2    .area_1      { position: absolute; top:  10mm; left:  10mm; width: 90mm; height: 120mm; }
          .area_2      { position: absolute; top:  10mm; left: 110mm; width: 90mm; height: 120mm; }
          .area_3      { position: absolute; top: 150mm; left:  10mm; width: 90mm; height: 120mm; }
          .area_4      { position: absolute; top: 150mm; left: 110mm; width: 90mm; height: 120mm; }

D3    .content_1   { position: absolute; top:   5mm; left:   5mm; width: 80mm; height: 110mm; }
          .content_2   { position: absolute; top:   5mm; left:   5mm; width: 80mm; height: 110mm; }
          .content_3   { position: absolute; top:  70mm; left:   5mm; width: 80mm; height:  45mm; }
          .content_4   { position: absolute; top:   5mm; left:  45mm; width: 40mm; height:  55mm; }

D4    .copyright   { position: absolute; top: 285mm; left:  10mm; width: 90mm; height:   5mm; }

</style>
</head>
<body>
        <div class="area_1">
                <img class="content_1"    src="text_1.gif"/>     D5
        </div>
        <div class="area_2">
                <img class="content_2"    src="graph.gif"/>
        </div>
        <div class="area_3">
                <img class="content_3"    src="photo.jpg"/>
        </div>
        <div class="area_4">
                <img class="content_4"    src="text_2.gif"/>
        </div>

<div class="copyright">
                <p> Copyright    ABC Co., Ltd.   2007 </p>       D6
        </div>
</body>
</html>
```

IMAGE READING DEVICE, IMAGE READING METHOD, AND IMAGE READING PROGRAM

This application claims priority to Japanese Patent Application No. 2008-030438, filed Feb. 12, 2008 and Japanese Patent Application No. 2008-309542, filed Dec. 4, 2008. The entire disclosures of which are expressly incorporated by reference herein.

BACKGROUND

1. Technical Field

The present invention relates to an image reading device, an image reading method, and an image reading program.

2. Related Art

A copier (including a composite machine or the like having a copy function) for optically reading a manuscript on which an image is recorded by a scanner, creating image data in accordance with a result of the reading, and converting the created image data into print data for printing has been generally known.

Further, a print image processing system has been known (see JP-A-2005-244802 (hereinafter referred to as Patent Document 1). In the print image processing system, when an image printed on a print paper in which one IC tag is embedded in each area that is divided in a net-like manner is scanned for copying, copying is prohibited for each area in which the IC tag in which output prohibit information is stored is embedded.

In the copier, there is a problem as described below.

When a selected manuscript is set on the scanner, a user generally inputs the size of the manuscript to the scanner so that the scanner recognizes an area for scanning. However, such an input operation is extremely troublesome for the user. Further, a scanner capable of omitting such an input operation has been also known. In the scanner, pre scanning is performed before main scanning to recognize the range in which the manuscript is placed, and only the recognized range is scanned when main scanning is performed. However, a time required for the copy operation is increased due to the pre scanning.

Further, when a manuscript is copied, there is a case that it is inadequate to copy all of the content recorded on the manuscript. For example, there is a case that a content whose copy is restricted due to copyright law, information that is kept secret from outsiders, personal information, or the like is included in a part area of the manuscript. In the past, copying of such a part area of the manuscript is prevented by painting the part that is inadequate to be copied or by covering the part with another paper by the user, so that it is very laborious for the user. Further, as in Patent Document 1, even when the user operates an output prohibit information writing device with respect to a paper to write output prohibit information in each of IC tags, the operation is very laborious for the user. Further, in the reading device of Patent Document 1, it is necessary to read information from the IC tag embedded in each of the areas of the paper divided in a net-like manner in order to recognize a copy prohibited area on the paper. Accordingly, a lot of time is required for the copy operation.

Further, there is also a problem from the viewpoint of saving a memory (storage device) equipped in the copier. Generally, image data loaded by scanning a manuscript is once accumulated in a memory in the copier before converted into print data. When stored in the memory, in order to reduce consumption of memory, the image data is stored after compressed by a predetermined compress method. Herein, when the type of the image such as a character, a photograph, a computer graphic, or the like is different, the best suited compress method becomes different from the view point of image quality or compression rate. Accordingly, when a plurality of images of different type exist on one manuscript, if the compress method can be changed for every area of image whose type is different, each of the images of different type can be respectively stored to have a sufficient image quality, and memory consumption can be reduced as a whole. However, it is burden for the copier to discriminate a character area or a photograph area on a manuscript by performing an analyzing processing to the image data obtained by the scanning, and it requires a lot of processing time. Further, when the discrimination is failed in the analyzing processing, an appropriate compression of image data is not provided in the end.

SUMMARY

An advantage of some aspects of the invention is to provided an image reading device, an image reading method, and an image reading program capable of reading a manuscript while efficiently saving a memory resource without impose a user on a burden, and capable of performing a processing for surly obtaining only a required copy result.

According to an aspect of the invention, there is provided an image reading device including a tag information reading unit for reading information recorded in an IC tag by performing radio communication with the IC tag attached or embedded at a predetermined position of a medium that becomes a target of image reading, and an image reading unit for creating image data of an image recorded on the medium by scanning the medium. The image reading unit determines an area for the scanning based on area information related to the medium among information read by the tag information reading unit and, and scans the determined area.

According to the aspect of the invention, the image reading unit determines the scanning area with respect to the medium based on the area information read from the IC tag of the medium. Accordingly, it is not necessary for a user to input the size of the medium to the image reading device or for the image reading device to perform pre scanning. Accordingly, image reading processing is completed at a short time only by setting the medium on the image reading device by the user.

It is also preferable that the image reading device further includes an image data processing unit for performing a process corresponding to the area information with respect to the image data created by the image reading unit.

Specifically, it is also preferable that the tag information reading unit reads positional information and type information of an image for every area of the medium, and the image data processing unit extracts each image data for every area from the image data based on the positional information, determines a compression method with respect to each image data for every area based on the type information, and compresses each image data for every area by determined each compression method. According to the structure, compression can be performed by the most suitable compress method to each image data for every area based on the positional information and the type information read from the IC tag of the medium. Accordingly, consumption of the memory in which the data after compression is stored can be surely restrained.

It is also preferable that the tag information reading unit reads information of an area of the medium in which copy is permitted or information of an area of the medium in which copy is prohibited, and the image data processing unit creates image data so that an area except an area that becomes a target of copy in the image data is not displayed based on the information of the area in which copy is permitted or the information of the area in which copy is prohibited. When printing (copying) is performed based on the image data created by the structure, a content or area that is inadequate for copying is not appeared in an output result.

It is also preferable that the tag information reading unit reads additional information related to a specific area on the medium, the additional information showing a content that is to be printed in an area corresponding to the specific area as a result of copy of the medium, and the image data processing unit creates image data for the copy based on the image data and the additional information. According to the structure, a copy result in which a content shown by the additional information is added on the image shown on the medium can be easily obtained.

It is also preferable that the image reading unit is equipped with a scanner, and the tag information reading unit is provided in the scanner.

The technical idea of the invention can be provided as an invention except the image reading device. That is, the invention can be provided as an image reading method provided by a processing that is performed by each unit of the image reading device, and as an image reading program that causes a computer to execute a function provided by each unit of the image reading device. Further, a medium itself in which the IC tag is embedded or the like can be provided as the invention, and an image reading system constituted by the medium and the image reading device can be provided as the invention. Further, the image reading device may be equipped with a print unit for converting image data into print data and for performing printing on a predetermined print medium based on the print data.

BRIEF DESCRIPTION OF THE DRAWINGS

The invention will be described with reference to the accompanying drawings, wherein like numbers reference like elements.

FIG. 1 is a diagram showing an example of an appearance of a printer and the like.

FIG. 4 is a diagram showing an example of data structure of tag information.

DESCRIPTION OF EXEMPLARY EMBODIMENTS

An embodiment of the invention will be described with reference to the accompanying drawings.

Figure 1:
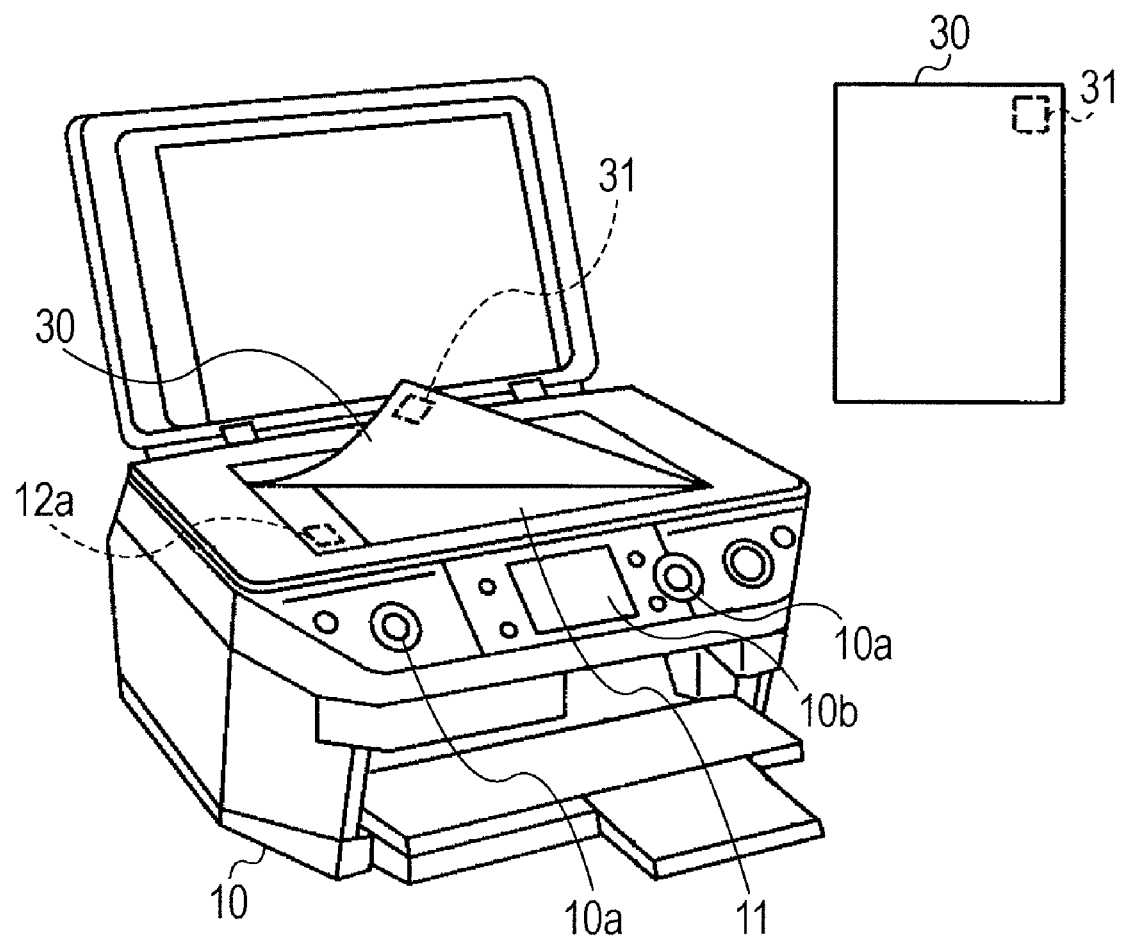

FIG. 1 is a diagram simply showing an appearance of a printer 10 according to the embodiment and the like. The printer 10 is a printer of a composite type, and equipped with a scanner function and a copy function in addition to a print function (including so called a direct print function). Further, the printer 10 may be equipped with various functions for example, a printing (label printing) function on a surface of a predetermined disc type media (CD-R or DVD), a backup storage function for storing data recorded in a predetermined memory card or the like in the disc type media or the like. Further, the printer 10 is appropriately equipped with an input receiving portion (button, touch panel, and the like) 10a as a user interface (UI) and a screen 10b. The printer 10 corresponds to an example of an image reading device.

Further, a paper (medium) 30 on which an image is printed is shown in FIG. 1. The paper 30 is a manuscript that becomes a target of copy by the printer 10. In the embodiment, an IC tag 31 is attached or embedded in the paper 30. The IC tag 31 is equipped with an IC chip and an antenna for the IC chip. As described below, various information (for example, area information) related to the paper 30 is preliminarily stored in a memory 31a in the IC chip. Hereinafter the information preliminarily recorded in the memory 31a is referred to as tag information D. One IC tag 31 is embedded at a predetermined end position of the paper 30 which is apart from the center area.

When the paper 30 is copied by the printer 10, the paper 30 is disposed on a transparent platen 11 as shown in FIG. 1. Generally, a light source (not shown) and an imaging element 14a (see FIG. 2) for reading a manuscript are provided below the platen 11. In the embodiment, a reader/writer device 12a for an IC tag 31 is provided near the platen 11. The reader/writer device 12a is disposed at a predetermined position below the platen 11 so as to be opposed to the IC tag 31 when the paper 30 is placed at a proper position on the platen 11.

Figure 2:
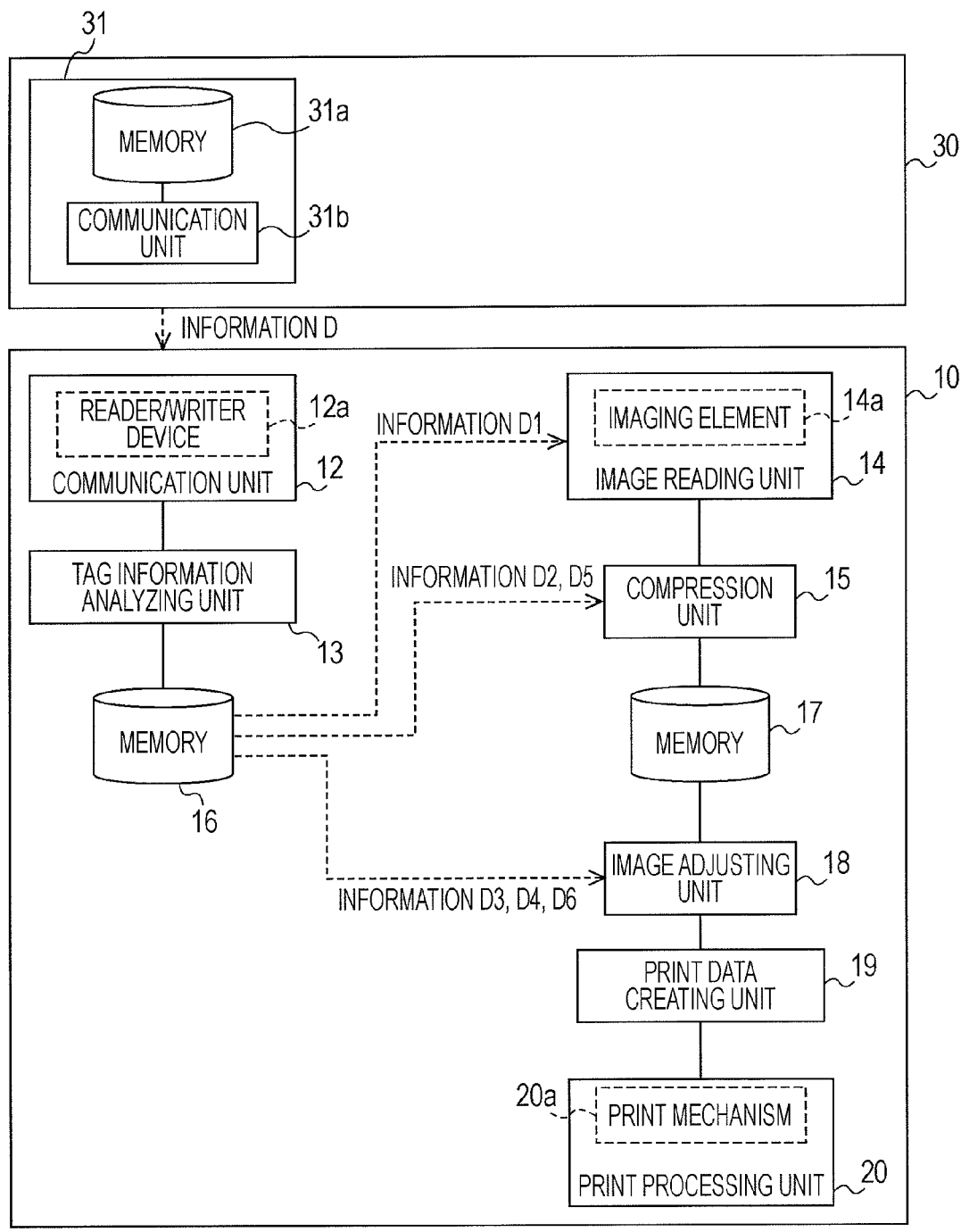
FIG. 2 is a block diagram showing an example of a function structure of the printer.

FIG. 2 is a block diagram showing functions of the printer 10 as an image reading device and the paper 30 (IC tag 31). The functions of the printer 10 shown in FIG. 2 are a part of the functions equipped with the printer 10. The IC tag 31 is equipped with the memory 31a and a communication unit 31b. The communication unit 31b is provided by an IC chip and an antenna.

The printer 10 is roughly equipped with a communication unit 12 for controlling the reader/writer device 12a and performing radio communication between the reader/writer device 12a and the IC tag 31, and a tag information analyzing unit 13 for analyzing the information received by the communication unit 12 (reader/writer device 12a) and extracting predetermined information.

Further, the printer 10 is equipped with an image reading unit 14 for reading an image recorded on the paper 30 by the imaging element 14a, a compression unit 4 for applying compression processing to the imaged data read and created by the image reading unit 14, an image adjusting unit 18 capable of executing an image adjust processing and the like to image data, a print data generating unit 19 for converting image data into print data, and a print processing unit 20 for performing printing based on the print data by controlling a print mechanism 20a. The print mechanism 20a is constituted by various mechanisms, for example, such as a print head for receiving ink from an ink cartridge and ejecting the ink, a print head driving circuit for controlling ejection of ink from the print head, a carriage for moving the print head, a paper feeding mechanism for supplying/discharging a print paper, and the like. The function of each unit of the printer 10 is provided by executing a predetermined program stored in a predetermined memory in the printer 10 by a control main body (CPU or the like) not shown of the printer 10. Further, the printer 10 is equipped with memories 16, 17.

In the embodiment, the reader/writer device 12a performs radio communication with the IC tag 31 by using the contactless communication standard called as NFC (Near Field Communication) when the IC tag 31 comes close to the reader/writer device 12a. In the NFC standard, communication is performed by using an electromagnetic induction method. That is, the reader/writer device 12a induces electric power in the antenna of the IC tag 31 side by flowing a current in the antenna equipped in the reader/writer device 12a itself to generate an electromagnetic field. The communication unit 31b of the IC tag 31 to which electric power is supplied by the electromagnetic induction can write information transmitted from the reader/writer device 12a in the memory 31a and can read out the tag information D recorded in the memory 31a and transmit to the reader/writer device 12a.

Figure 3:
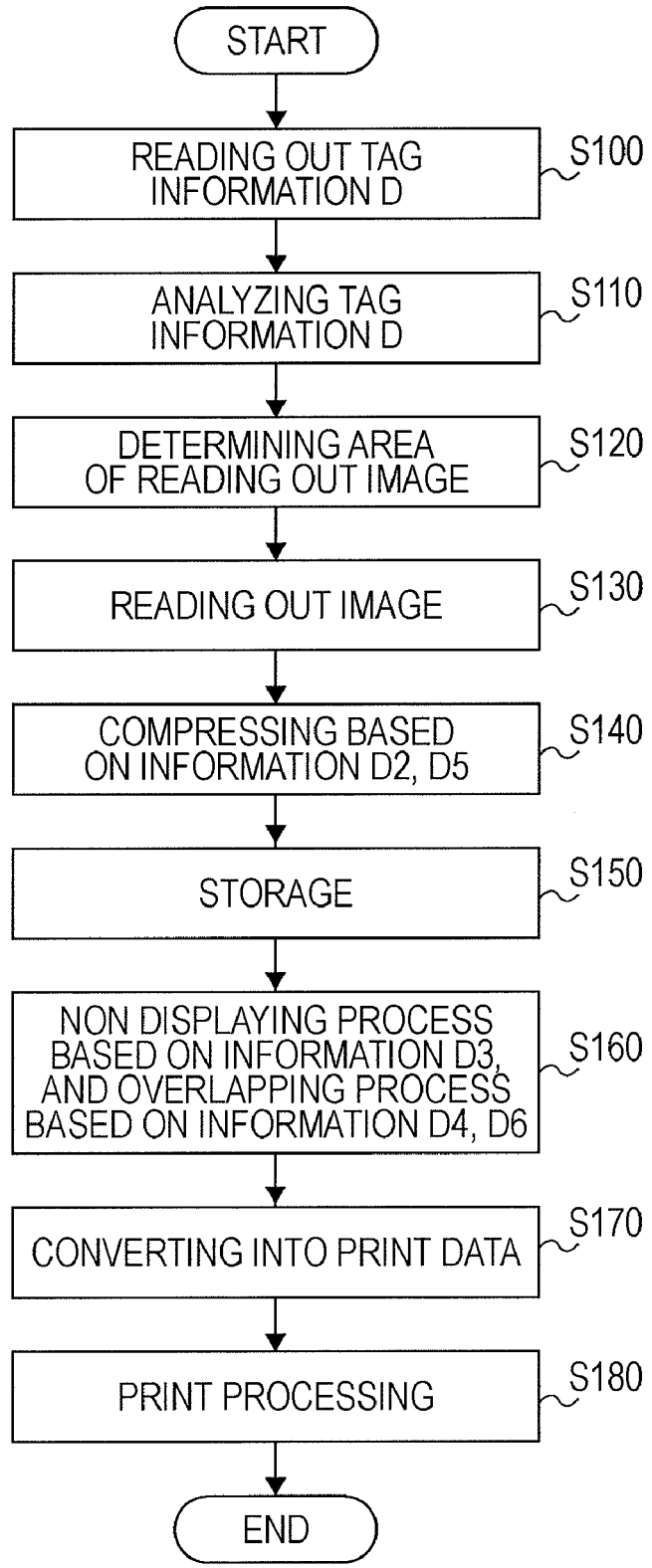
FIG. 3 is a flowchart showing an example of a processing performed by the printer.

FIG. 3 is a flow chart showing an image reading process and a copy process executed by the printer 10. On the assumption that the processes are performed, the paper 30 is disposed on the platen 11, and an instruction for executing copy is made to the printer 10 by a user.

In step S100 (hereinafter description of the step will be omitted), the communication unit 12 makes the reader-writer device 12a to start radio communication with the IC tag 31, to read the tag information D recorded in the memory 31a, and to transfer the tag information D to the tag information analyzing unit 13. The communication unit 12 and the reader/writer device 12a correspond to a tag information analyzing unit.

In S110, the tag information analyzing unit 13 analyzes the tag information D.

FIG. 4 shows an example of a data structure of the tag information D. The tag information D may be described by various languages. In the embodiment, the tag information D is described by using a language called as xHTML-Print. Paper size information D1 is described in a head area (in FIG. 4, an area between <head> and </head>) of the tag information D. The paper size information D1 described as @page { . . . } shows horizontal and vertical sizes of the paper 30 in which the IC tag 31 is attached or embedded. The paper size information D1 is a kind of area information related to the paper. Further, the paper size information D1 also regulates margin amounts of left, right, top, and bottom of the paper 30.

Further, in the head area of the tag information D, in-paper area information D2 showing a position (area) of each image printed on the paper 30 is described. In the example of FIG. 4, four in-paper area information D2 (area_1{ . . . }, area_2{ . . . }, area_3{ . . . }, area_4{ . . . }) are described. Note that the number of image (area) regulated by the in-paper area information D2 is not specifically limited.

Further, in the head area of the tag information D, copy permitted area information D3 showing an area in which copying is permitted in the area of the aforementioned each image printed on the paper 30 is described. In the example of FIG. 4, copy permitted area information D3 (content_1{ . . . }, content_2{ . . . }, content_3{ . . . }, content_4{ . . . }) showing an area inside each of aforementioned four areas area_1{ . . . }, area_2{ . . . }, area_3{ . . . }, area_4{ . . . } is described. The area in which copying is permitted may be an area except an image whose copying is prohibited due to copyright law, an area except an image which should not be copied in view of preventing leakage of society information or personal information, and an area except marginal parts of an image.

Further, in the head area of the tag information D, additional image area information D4 is described like copyright { . . . }. The additional image area information D4 shows a specific area of the paper 30, and at the same time, shows a print area of an additional image that is printed with an image of the paper 30 as a result of copy. The additional image may be a character string showing the producer name of the image printed on the paper 30, a character string showing a cautionary statement indicating of being a copy, or the like.

Further, in a body area of the tag information D (the area between <body> and </body> in FIG. 4), type information D5 of the aforementioned each image (also referred to as a content) printed on the paper 30 is described. In the example of FIG. 4, the type information D5 includes information showing a type of each image itself such as "text", "graph", "photo", or the like and information showing a type of compression format suited for each image such as "gif", "jpg", or the like.

Further, in the body area of the tag information D, additional image information (additional information) D6 showing a specific content of the additional image (character string or the like) is described.

The paper area information D2, the copy permitted area information D3, the additional image area information D4, the type information D5, and the additional image information D6 are a kind of the area information related to the paper.

In S110, the tag information analyzing unit 13 extracts the paper size information D1, the in-paper area information D2, the copy permitted area information D3, the additional image area information D4, the type information D5, and the additional image information D6 from the tag information D by analyzing the tag information D. The tag information analyzing unit 13 stores each of the extracted information in the memory 16.

Figure 5:
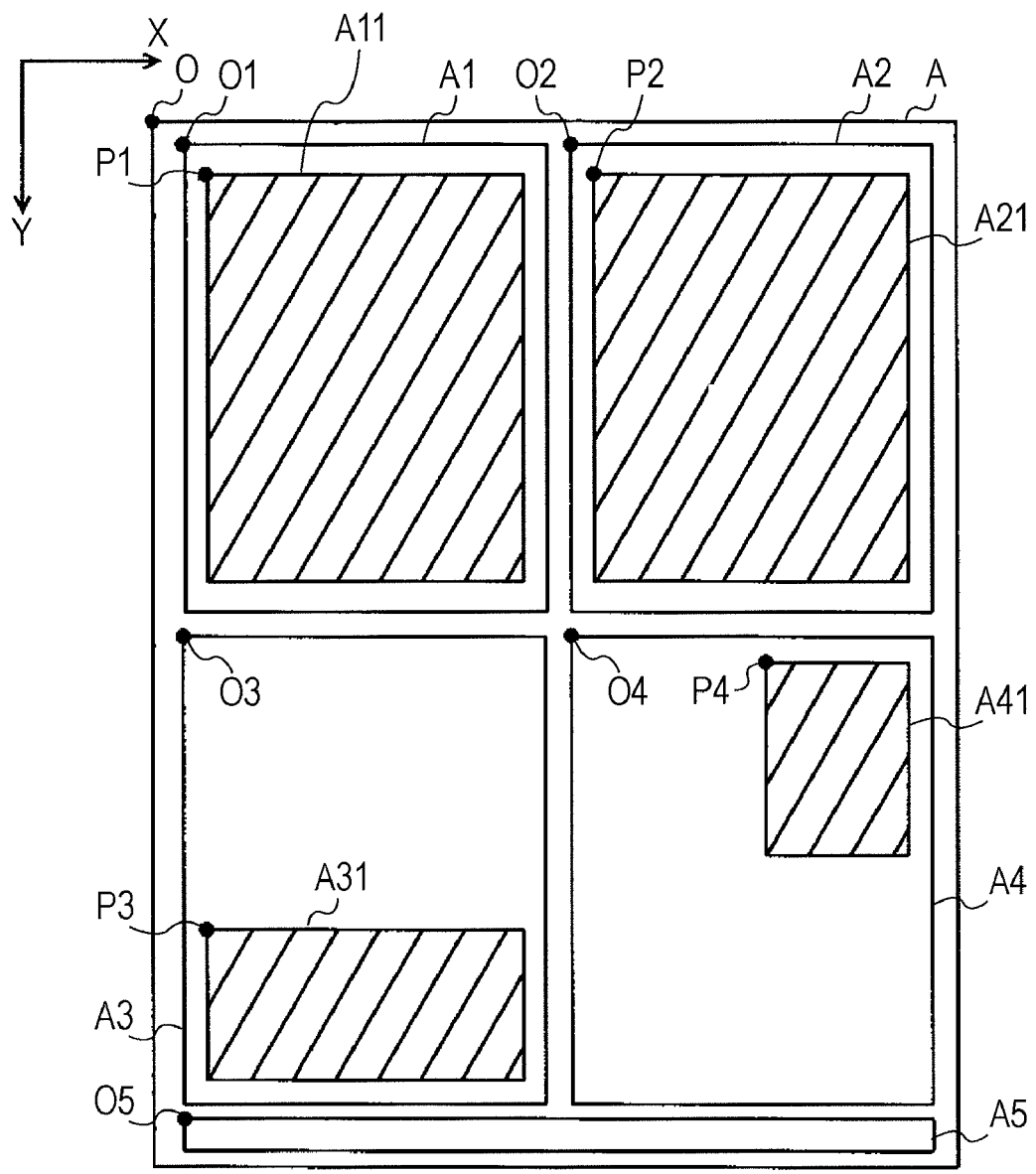
FIG. 5 is a diagram showing an example of a placement and the like of each image recognized by the printer based on the tag information.

FIG. 5 shows an arrangement relation and the like of each image that can be recognized by the printer 10 on predetermined two dimensional coordinates based on each information extracted from the tag information D. A paper area A is shown in FIG. 5. The paper area A is determined based on a horizontal size (X direction) and a vertical size (Y direction) of the paper shown by the paper size information D1. In FIG. 5, the corner of the left-top of the paper area A shall be the paper origin position O.

Areas A1, A2, A3, A4 are areas respectively determined by the area_1{ . . . }, area_2{ . . . }, area_3{ . . . }, area_4{ . . . } (in-paper area information D2). "top" and "left" regulated by each area_1{ . . . }, area_2{ . . . }, area_3{ . . . }, area_4{ . . . } show a position of area origin positions O1, O2, O3, O4 (left-top corner of each area) of each of the areas A1, A2, A3, A4 with respect to the paper origin position O. "top" shows a distance from the paper origin position O in the Y direction, and "left" shows a distance from the paper origin position O in the X direction. "width" regulated by each area_1{ . . . }, area_2{ . . . }, area_3{ . . . }, area_4{ . . . } respectively is a width of each of the areas A1, A2, A3, A4, in the X direction, and the "height" is a width of each of the areas A1, A2, A3, A4 in the Y direction.

Areas A11, A21, A31, A41 that are hatched are areas respectively determined by the content_1{ . . . }, content_2{ . . . }, content_3{ . . . }, content_4{ . . . } (copy permitted area information D3). "top" and "left" regulated by each content_1{ . . . }, content_2{ . . . }, content_3{ . . . }, content_4{ . . . } show a position of each of starting pints P1, P2, P3, P4 (left-top corner of each area) of the areas A11, A21, A31, A41 from the each of the area origin positions O1, O2, O3, O4 of the areas A1, A2, A3, A4 in which corresponding one of the areas A11, A21, A31, A41 is contained. For example, "top" and "left" in the content_1{ . . . } that regulates the position of the starting point P1 of the area A11 are distances in the X direction and Y direction from the area origin position O1 of the area A1 in which the area A11 is included. "width" regulated by each content_1{ . . . }, content_2{ . . . }, content_3{ . . . }, content_4{ . . . } is a width of each of the areas A11, A21, A31, A41 in the X direction, and "height" is a width of each of the areas A11, A21, A31, A41 in the Y direction.

An area A5 is an area determined by the copyright{ . . . } (additional image area information D4), and shows a print area for the additional image. "top" and "left" regulated by the copyright{ . . . } show a position of an origin position O5 (left-top corner of the area) of the area A5 from the paper origin position O. "width" regulated by the copyright{ . . . } is a width of the area A5 in the X direction and "height" is a width of the area A5 in the Y direction.

In S120, the image reading unit 14 reads out the paper size information D1 stored in the memory 16 and determines the area to be read by the imaging element 14 based on the paper size information D1. That is, the size (A4 size, letter size, L size, or the like) of the manuscript (paper 30) that is a target to be read out from now can be discriminated by referencing the paper size information D1. Accordingly, the image reading unit 14 determines the area corresponding to the size shown in the paper size information D1 as the reading area.

In S130, the image reading unit 14 makes the imaging element 14a to scan the reading area determined in S120, and creates image data based on an output (electric signal) from the imaging element 14a. The image reading unit 14 transmits the created image data to the compression unit 15.

In S140, the compression unit 15 reads out the in-paper area information D2 and the type information D5 stored in the memory 16, and determines a compression format and a compression rate (compression method) that is most appropriate for each image (in the example of FIG. 5, images of area A1 to A4) in the image data. That is, the compression unit 15 determines the compression method suited for every type (text, graph, photo, or the like) of each image (each content) contained in the type information D5 based on a predetermined discrimination standard. Note that when information showing the compression format (gif, jpg, or the like) corresponding to each image as described above is included in the type information D5, the compression format is determined for each image. Further, the compression unit 15 segments each image data (area image data) of the areas A1 to A4 from the image data transmitted from the image reading unit 14 based on the in-paper area information D2, and compresses each area image data by using the determined compression method for every areas A1 to A4. Note that the order of the determination of the compression method by the compression unit 15 and the segmentation (extraction) of the area image data is not determined.

In step 150, the compression unit 15 stores each area image data after compression in the memory 17.

In step S160, the image adjusting unit 18 reads out each area image data from the memory 17 and performs a predetermined image processing. At this time, the image adjusting unit 18 may further perform a next image processing after performing an extension processing and a pixel interpolation processing to the read out each area image data as appropriate and creating image data corresponding to one image by combining each area image data. In the embodiment, the image adjusting unit 18 performs a non-display processing to the area except a copy permitted area and an overlapping processing of the additional image.

In the non-display processing, the image adjusting unit 18 reads the copy permitted area information D3 from the memory 16, and performs a non-display processing to all pixels except the area (in the example of FIG. 5, areas A11, A12, A13, A14) shown by the copy permitted area information D3 (content_1{...}, content_2{...}, content_3{...}, content_4{...}) in the image data. In the non-display processing, for example, when a pixel that is a target of the non-display processing is expressed by each gradation of red (R), green (G), blue (B), all of the gradations of RGB are maximized (for example, when gradation value is expressed by 256 gradations of 0 to 256 gradations, gradations of RGB shall be R=G=B=255). Since the pixel whose RGB gradations are maximized becomes white, the ink amount set when creating print data to be described below becomes zero.

In the overlapping processing of an additional image, the image adjusting unit 18 reads out the additional image area information D4 and the additional image information D6 from the memory 16, and overlaps an image (character string or the like) shown by the additional image information D6 with the area (in the example of FIG. 5, area A5) shown by the additional image area information D4 in the image data. Note that the image adjusting unit 18 may perform various image quality adjusting processing, for example, such as brightness correction, saturation correction, white balance adjustment, or the like with respect to image data of each pixel. The compression unit 15 and the image adjusting unit 18 respectively correspond to an image data processing unit.

In step S170, the print data creating unit 19 converts the image data processed by the image adjusting unit 18 into print data. The print data is data that regulates an ink amount of each color (for example, cyan (C), magenta (M), yellow (Y), black (K), or the like) for every pixel. The print data creating unit 19 creates the print data by performing a color conversion processing, a halftone processing, a rasterization processing, or the like to the image data.

In step 180, the print processing unit 20 controls the print mechanism 20a to perform printing based on the print data. As a result, an image on the print paper 30 is copied as an output result. However, in the output result, only the image in the area shown by the copy permitted area information D3 among the image printed on the paper 30 is appeared, and an image shown by the additional image information D6 is printed in the area shown by the additional image area information D4.

In this manner, according to the embodiment, when the paper 30 in which the IC tag 31 is attached or embedded as a target is copied with the printer 10, the tag information D that is preliminarily recorded in the IC tag 31 is read by using the reader/writer device 12a provided near the platen 11. Then, in the printer 10, the paper size information D1, the in-paper area information D2, the copy permitted area information D3, the additional image area information D4, the type information D5, and the additional image information D6, and the like are extracted from the tag information D by the tag information analyzing unit 13. The image reading unit 14 makes the imaging element 14a to perform scanning after determining (restricting) the reading area based on the paper size information D1. Accordingly, it is not necessary for a user to input a paper size to a machine or to recognize the existing area of the paper by performing a print scan at the machine side when performing copy. Accordingly, what is necessary for the user is only to set the paper 30 on the platen 11 and to instruct scanning, so that the paper 30 can be scanned at a shorter time than before.

Further, according to the embodiment, the compression unit 15 can perform a compression by the most suitable compress method to each image that is different in type in the paper 30 to store in the memory 17 by referencing the in-paper area information D2 and type information D5. Accordingly, consumption of the memory 17 can be effectively restrained. Further, as compared with the case where image data itself is analyzed to discriminate an image type for every area as in the past, the time required till the compression image is stored can be shortened, and risk of mistaking discrimination of the type of image is reduced. Further, by the saving effect of the memory 17 and the shortening effect of the time required for the compression processing and storing in the memory 17, when the printer 10 reads a plurality of manuscripts for storing by using so called as an auto document feeder, it becomes possible to read many manuscripts for storing at a shorter time.

Further, according to the embodiment, the image adjusting unit 18 performs a non-display processing to the image data that does not belong to the area in which copy is permitted based on the copy permitted area information D3. Accordingly, it does not necessary for the user to separate the area of the paper into the area that is copied and the area that is not copied with many man-hours as in the past, and a part which is not adequate for copying such as an image whose copy is prohibited due to the copyright law, society information, personal information, or the like can be surly eliminated from the copy result only by setting the paper 30 on the platen 11 and instructing copying. Further, the non-display processing can be performed also to the blank portion of the paper 30 based on the copy permitted area information D3. Accordingly, even when dust or stain is adhered in the blank portion, the dust or the stain does not appear in the copy result.

Note that, copy non-permitted area information may be recorded in the tag information D in stead of the copy permitted area information D3. The copy non-permitted area information is information in which an area that is not permitted of copying in the area of the paper is described. The copy non-permitted area information is also extracted from the tag information D by the tag information analyzing unit 13, and the image adjusting unit 18 performs the non-display processing to the image data belonging to the area in which copy is not permitted based on the copy non-permitted area information.

Further, according to the embodiment, the image adjusting unit 18 overlaps an image shown by the additional image information D6 in the area corresponding to the additional image area information D4 in the image data based on the additional image area information D4 and the additional image information D6. Accordingly, a predetermined image such as copyright name of the image, a cautionary statement showing being a copy, or the like is also automatically printed in the print result of the paper 30.

In the embodiment, the case is described in which the paper 30 is copied by the printer 10. However, in the embodiment, it is also possible to create data for recreating (printing) the image on the paper 30 based on the tag information D stored in the memory 16 and each area image data stored after compression in the memory 17. As described above, the tag information D is described by xHTML-Print language. Accordingly, the printer 10 describes a storage place (storage place in the storage area of the memory 17) of each area image data after compression in the tag information D. For example, the printer 10 describes a storage place of each area image data in an area in which the type information D5 is described in the body area of the tag information D. In this manner, when the tag information D in which a part of the information is rewritten is stored as data for recreating (printing) an image on the paper 30, the printer 10 can perform printing abased on the stored data depending on requirement from the user even after the aforementioned copy is performed. That is, the printer 10 reads out each area image data from the memory 17 by referencing each storage place described in the body area, and disposes each image shown by each read area image data based on the in-paper area information D2, and creates image data corresponding to one image. Then, the printer 10 converts the created image data into print data and performs printing based on the print data after conversion.

Further, when the image reading unit 14 is a scanner that obtains image data of a medium by scanning a carriage, it is preferable to provide the reader/writer device 12 in the carriage. By providing the reader/writer device 12 in the carriage, the IC tag 31 positioned at any area on the platen 11 can be read by moving (scanning) the carriage. Accordingly, the IC tag 31 can be attached at a free position on a medium that becomes a target for reading an image.

As a result, even when the IC tag is attached on a medium having any size and shape, the IC tag can be read without increasing the number of the reader/writer device 12a. The carriage equipped in the image reading unit 14 corresponding to an example of a scanner.

Further, when the image reading unit 14 is a scanner equipped with an ADF (auto document feeder) for obtaining image data of a medium by moving the medium while fixing the imaging element 14a, the IC tag 31 positioned at any position on the medium can be read by provided the reader/writer device 12a near the imaging element 14a. Accordingly, similarly to the case of a flat-bed scanner, even when the IC tag is attached on a medium having any size and shape, the IC tag can be read without increasing the number of the reader/writer device 12a.

What is claimed is:

1. An image reading device comprising:
a tag information reading unit for reading information recorded in an IC tag by performing radio communication with the IC tag attached or embedded at a predetermined position of a medium that becomes a target of image reading;
an image reading unit for creating image data of an image recorded on the medium by scanning the medium, wherein
the image reading unit determines a scanning area from a plurality of scannable areas based on area information related to the content on the medium among information read by the tag information reading unit from the IC tag and scans the determined scanning area,
an image data processing unit for performing a process corresponding to the area information with respect to the image data created by the image reading unit, wherein
when the determined scanning area comprises a plurality of scanning areas having images of differing types at different positions,
the tag information reading unit reads positional information and type information of an image for every area of the plurality of scanning areas from the IC tag, and
the image data processing unit extracts each image data for every area of the plurality of scanning areas from the image data based on the positional information, determines a compression method with respect to each image data for every area based on the type information, and compresses each image data for every area by the determined compression method,
wherein the determined compression method differs according to the differing type of image.

2. The image reading device according to claim 1 wherein, the tag information reading unit reads information of each area of a plurality of areas of the medium in which copy is permitted or prohibited from the IC tag, and
the image data processing unit creates image data so that one or more areas of the plurality are not displayed based on the information of the area in which copy is permitted or the information of the area in which copy is prohibited.

3. The image reading device according to claim 1, wherein the tag information reading unit reads additional information related to a specific area on the medium, the additional information showing a content that is to be printed in an area corresponding to the specific area as a result of copy of the medium, and the image data processing unit creates image data for the copy based on the image data and the additional information.

4. The image reading device according to claim 1, wherein the image reading unit is equipped with a scanner, and the tag information reading unit is provided in the scanner.

5. An image reading method comprising:
reading information recorded in an IC tag by performing radio communication with the IC tag attached or embedded at a predetermined position of a medium that becomes a target of image reading,
creating image data of an image recorded on the medium by scanning the medium,
determining a scanning area from a plurality of scannable areas based on area information related to the content on the medium among information read by the tag information reading unit from the IC tag,
scanning the determined scanning area,
performing a process corresponding to the area information with respect to the image data, wherein
when the determined scanning area comprises a plurality of scanning areas having images of differing types at different positions,
positional information and type information of an image is read for every area of the plurality of scanning areas from the IC tag, and
each image data for every area of the plurality of scanning areas is extracted from the image data based on the positional information and is compressed for every area by a compression method determined with respect to each image data for every area based on the type information,
wherein the determined compression method differs according to the differing type of image.

6. A non-transitory computer readable memory having recorded thereon an image reading program causing a computer to execute:
a tag information reading function for reading information recorded in an IC tag by performing radio communication with the IC tag attached or embedded at a predetermined position of a medium that becomes a target of image reading,
an image reading function for creating image data of an image recorded on the medium by scanning the medium, and determining a scanning area from a plurality of scannable areas based on area information related to the content on the medium among information read by the tag information reading unit from the IC tag and scanning the determined scanning area,
an image data processing function for performing a process corresponding to the area information with respect to the image data, wherein
when the determined scanning area comprises a plurality of scanning areas having images of differing types at different positions,
positional information and type information of an image is read for every area of the plurality of scanning areas from the IC tag, and
each image data for every area of the plurality of scanning areas is extracted from the image data based on the positional information and is compressed for every area by a compression method determined with respect to each image data for every area based on the type information,
wherein the determined compression method differs according to the differing type of image.

* * * * *